(12) United States Patent
Rodriguez

(10) Patent No.: US 12,464,989 B2
(45) Date of Patent: Nov. 11, 2025

(54) VOLARIZATION OF GYPSUM MATERIAL VIA MYCOREMEDIATION

(71) Applicant: MYCOCYCLE, INC., Bolingbrook, IL (US)

(72) Inventor: Joanne Rodriguez, Bolingbrook, IL (US)

(73) Assignee: MYCOCYLE, INC., Bolingbrook, IL (US)

( * ) Notice: Subject to any disclaimer, the term of this patent is extended or adjusted under 35 U.S.C. 154(b) by 0 days.

(21) Appl. No.: 18/628,384

(22) Filed: Apr. 5, 2024

(65) Prior Publication Data

US 2024/0334887 A1    Oct. 10, 2024

Related U.S. Application Data

(60) Provisional application No. 63/495,136, filed on Apr. 10, 2023, provisional application No. 63/495,085, filed on Apr. 8, 2023.

(51) Int. Cl.
*A01G 18/20*    (2018.01)

(52) U.S. Cl.
CPC .................. *A01G 18/20* (2018.02)

(58) Field of Classification Search
CPC ............... A01G 18/00; A01G 18/20
See application file for complete search history.

(56) References Cited

U.S. PATENT DOCUMENTS

| | | | |
|---|---|---|---|
| 11,866,691 B2* | 1/2024 | English | C12N 1/14 |
| 11,920,126 B2* | 3/2024 | Schaak | C12N 9/88 |
| 11,932,584 B2* | 3/2024 | Bayer | A01G 18/50 |
| 2016/0355779 A1 | 12/2016 | Ross | |
| 2020/0239830 A1* | 7/2020 | O'Brien | C12N 1/38 |
| 2022/0217923 A1* | 7/2022 | Mershin | A01G 18/70 |
| 2022/0298470 A1 | 9/2022 | Sayed et al. | |
| 2022/0361424 A1 | 11/2022 | Mueller et al. | |
| 2024/0093139 A1* | 3/2024 | Yu | E04B 1/78 |

FOREIGN PATENT DOCUMENTS

| | | | |
|---|---|---|---|
| CN | 114175968 A | * | 3/2022 |
| EP | 4144821 B1 | | 3/2023 |

OTHER PUBLICATIONS

PCT, "International Search Report," regarding Application No. PCT/US24/23326, 37 pages, mailed Jul. 17, 2024.

* cited by examiner

*Primary Examiner* — Monica L Perry
*Assistant Examiner* — Aaron M Rodziwicz
(74) *Attorney, Agent, or Firm* — Lathrop GPM LLP; Malaika O.D. Tyson

(57) ABSTRACT

Methods for producing a bio-based material from a waste material containing gypsum via mycoremediation. Under controlled environmental conditions, the mycological conversion of waste containing gypsum diverts waste streams from landfills and creating pathways of reuse as new mycelium-based materials. Mycoremediation provides an ability to sustainably produce resilient sources of many products and allows for economically and environmentally viable alternatives to many synthetic and carbon-rich materials.

23 Claims, 13 Drawing Sheets

VOLARIZATION OF GYPSUM MATERIAL VIA MYCOREMEDIATION

RELATED APPLICATIONS

The present patent application claims the priority benefit of U.S. Provisional Patent Application No. 63/495,085, filed Apr. 8, 2023 and U.S. Provisional Patent Application No. 63/495,136, filed Apr. 10, 2023, the content of which is hereby incorporated by reference in its entirety into this disclosure.

BACKGROUND

Landfills are at 85% capacity, and the waste industry accounts for 16% of total methane emissions. Mismanaged waste results in 400,000+ deaths each year. A need exists for a natural waste solution to address the current waste and emission challenges.

Mycoremediation can advance the transition from the current economic model into a bio-based circular economy, provides an ability to sustainably produce resilient sources of many products, and allows for economically and environmentally viable alternatives to many synthetic and carbon-rich materials.

BRIEF SUMMARY

The present disclosure relates to the mycological conversion of gypsum drywall waste under controlled environmental conditions. This is advantageous as it allows for diverting generated waste streams from landfills and creating pathways of reuse as new mycelium-based materials.

One aspect of the present disclosure is a method for producing a bio-based material, the method including obtaining a waste material, wherein at least a portion of the waste material includes gypsum; preparing a growth medium, wherein at least a portion of the growth medium is the waste material; incubating the growth medium with at least one bioremediating composition to generate a molded growth material, wherein the at least one bioremediating composition includes at least one fungal culture; and producing a bio-based material from the molded growth material.

In an aspect, gypsum is selected from the group including crude gypsum, raw gypsum, gypsum board, gypsum drywall, gypsum building material, a board with a gypsum core and a paper facing, sheet products consisting essentially of gypsum, gypsum panels, gypsum plaster, gypsum ceiling tiles, gypsum partitions, and gypsum sheathing. In another aspect, the gypsum is painted.

In some aspects, the growth medium and/or the waste material do not comprise soil.

In some aspects, the growth medium is incubated with at least two bioremediating compositions, alternatively at least three bioremediating compositions, alternatively at least four bioremediating compositions, alternatively at least five bioremediating compositions, wherein each bioremediating composition comprises a different fungal culture.

In an aspect, the growth medium is incubated with the bioremediating composition for at least about 3 days, alternatively at least about 5 days, alternatively at least about 1 week, alternatively at least about 2 weeks, alternatively at least about 3 weeks, alternatively at least about 4 weeks, alternatively at least about 5 weeks.

In an aspect, incubating includes monitoring colonization of the fungal culture in the molded material. In another aspect, the method further includes selecting the molded material with the highest percentage of colonization. In an aspect, the selected molded material undergoes a secondary incubation.

In an aspect, the fungal culture includes *Pleurotus ostreatus, Pleurotus pulmonarius, Ganoderma lucidum, Ganoderma tsugae, Ganoderma oregonense, Trametes versicolor, Pleurotus columbinus, Pleurotus eryngii, Agrocybe* spp., *Amanita* spp., *Armillaria* spp., *Auricularia* spp., *Cerrena* spp., *Coprinus* spp., *Cyathus* spp., *Daedalea* spp., *Daedaleopsis* spp., *Daldinia* spp., *Echinodontium* spp., *Exidia* spp., *Fistulina* spp., *Flammulina* spp., *Fames* spp., *Grifola* spp., *Hericium* spp., *Heterobasidion* spp., *Hypsizygus* spp., *Inonotus* spp., *Lenzites* spp., *Marasmius* spp., *Phanerochaete* spp., *Pisolithus* spp., *Sparassis* spp., *Strobilomyces* spp., *Xylaria* spp., *Pleurotus* spp., *Ganoderma* spp., *Trametes* spp. *Schizophyllum* spp., *Irpex* spp. and/or *Lentinula* spp.

In an aspect, the bioremediating composition further comprises a sterilizing agent and/or water.

In an aspect, the method further includes hydrating the molded growth material; exposing the molded growth material to air; storing the molded growth material; drying the molded growth material; finishing the molded growth material to make a bio-based material; and/or collecting the bio-based material.

In an aspect, the waste material further includes calcium carbonate, magnesium hydroxide, paper, aluminum trihydrate, bulking agents, fillers, fibers and/or material present in construction materials.

In an aspect, the levels of toxins in the bio-based material are lower than levels of toxins in the waste material. In another aspect, the toxins are selected from the group consisting of antimony, arsenic, beryllium, cadmium, chromium, copper, lead, mercury, nickel, selenium, silver, thallium, zine, acetone, and combinations thereof.

In an aspect, the levels of VOCs in the waste material are reduced by at least about 50%; or alternatively, by at least about 60%; or alternatively, by at least about 70%; or alternatively, by at least about 80%; or, alternatively, by at least about 90%.

In an aspect, the bio-based material has similar characteristics to low density or foamed materials. In another aspect, the bio-based material includes mycelium or a mycelium composite. In an aspect, the bio-based material further includes gypsum. In an aspect, the gypsum is gypsum drywall.

One aspect of the disclosure is a bio-based material including gypsum drywall and mycelium spawn.

Another aspect of the disclosure is a method of reducing and/or preventing greenhouse gas emissions, the method including: on-site remediation of at least one building material, wherein at least a portion of the building material includes gypsum, and wherein the remediation includes: preparing a growth medium, wherein at least a portion of the growth medium is the building material; incubating the growth medium with at least one bioremediating composition to generate a molded growth material, wherein the at least one bioremediating composition comprises at least one fungal culture; and, wherein the fungal culture comprises *Pleurotus ostreatus, Pleurotus pulmonarius, Ganoderma lucidum, Ganoderma tsugae, Ganoderma oregonense, Trametes versicolor, Pleurotus columbinus, Pleurotus eryngii, Agrocybe* spp., *Amanita* spp., *Armillaria* spp., *Auricularia* spp., *Cerrena* spp., *Coprinus* spp., *Cyathus* spp., *Daedalea* spp., *Daedaleopsis* spp., *Daldinia* spp., *Echinodontium* spp., *Exidia* spp., *Fistulina* spp., *Flammu-*

*lina* spp., *Fames* spp., *Grifola* spp., *Hericium* spp., *Heterobasidion* spp., *Hypsizygus* spp., *Inonotus* spp., *Lenzites* spp., *Marasmius* spp., *Phanerochaete* spp., *Pisolithus* spp., *Sparassis* spp., *Strobilomyces* spp., *Xylaria* spp., *Pleurotus* spp., *Ganoderma* spp., *Trametes* spp. *Schizophyllum* spp., *Irpex* spp. and/or *Lentinula* spp.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

Various aspects of the present disclosure will now be described, by way of example only, with reference to the attached Figures, wherein.

DETAILED DESCRIPTION

Figure 1:
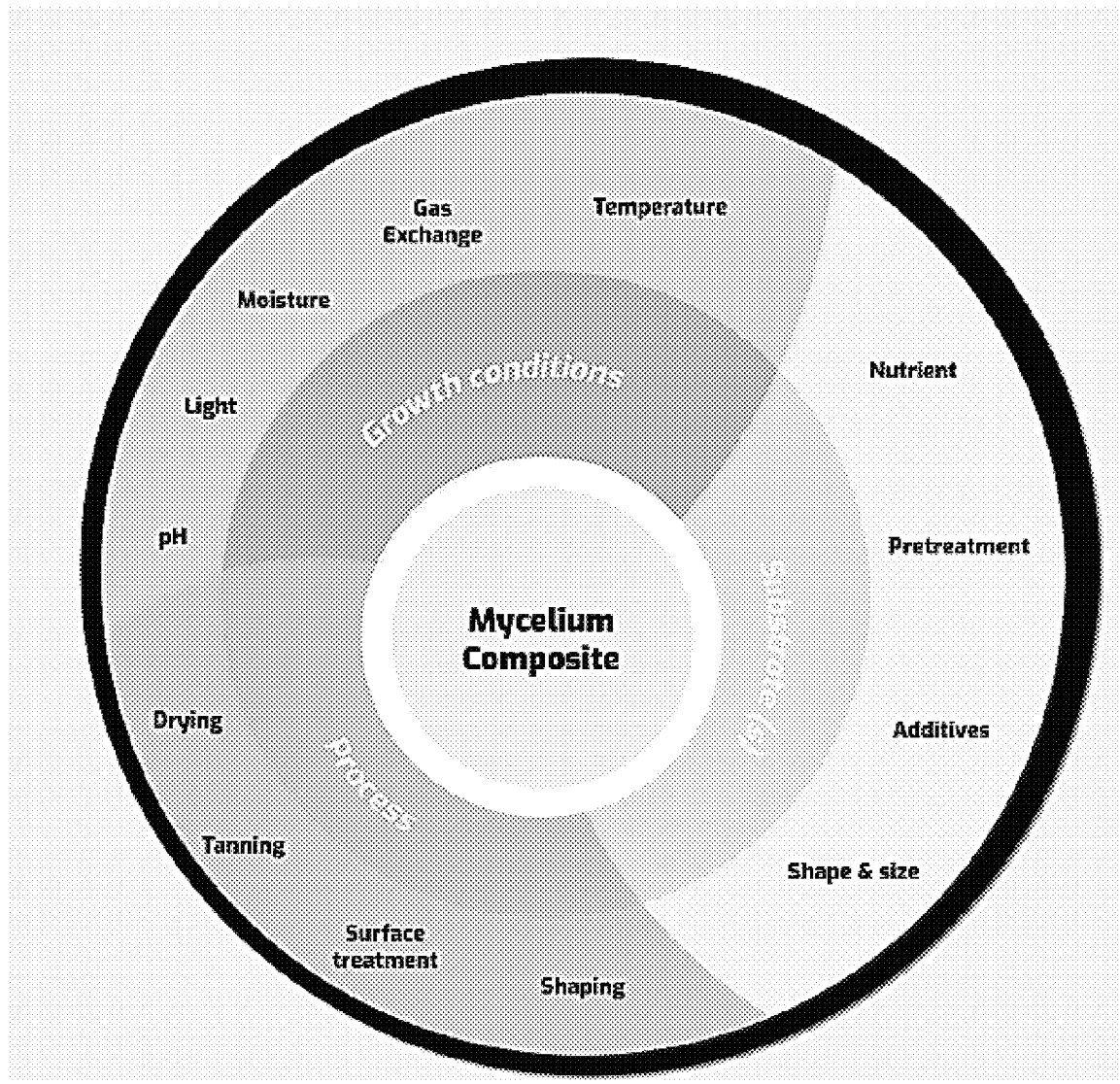
FIG. 1 illustrates the main components of a mycelium-based composite material.

Extracellular metabolism through enzymatic activity enables fungi to break down the most recalcitrant compounds in nature. Substrate feedstock and additives strongly influence material properties, including compressive strength, flexibility, and electrical conductivity. Strong evidence links hyphal architecture with compressive strength. FIG. 1 illustrates the main components of a mycelium-based composite material.

Gypsum, also known as gypsum board or gypsum drywall, is a building material used in wall, ceiling, and partition systems. Gypsum may also refer to a specific board with a gypsum core and a paper facing. Gypsum products are defined in ASTM C11, *Standard Terminology Relating to Gypsum and Related Building Materials and Systems*, as "the general name for a family of sheet products consisting essentially of gypsum." The term gypsum includes crude gypsum, raw gypsum, gypsum board, gypsum drywall, gypsum building material, a board with a gypsum core and a paper facing, sheet products consisting essentially of gypsum, gypsum panels, gypsum plaster, gypsum ceiling tiles, gypsum partitions, and gypsum sheathing. In some aspects, the gypsum is painted.

Figure 2A:
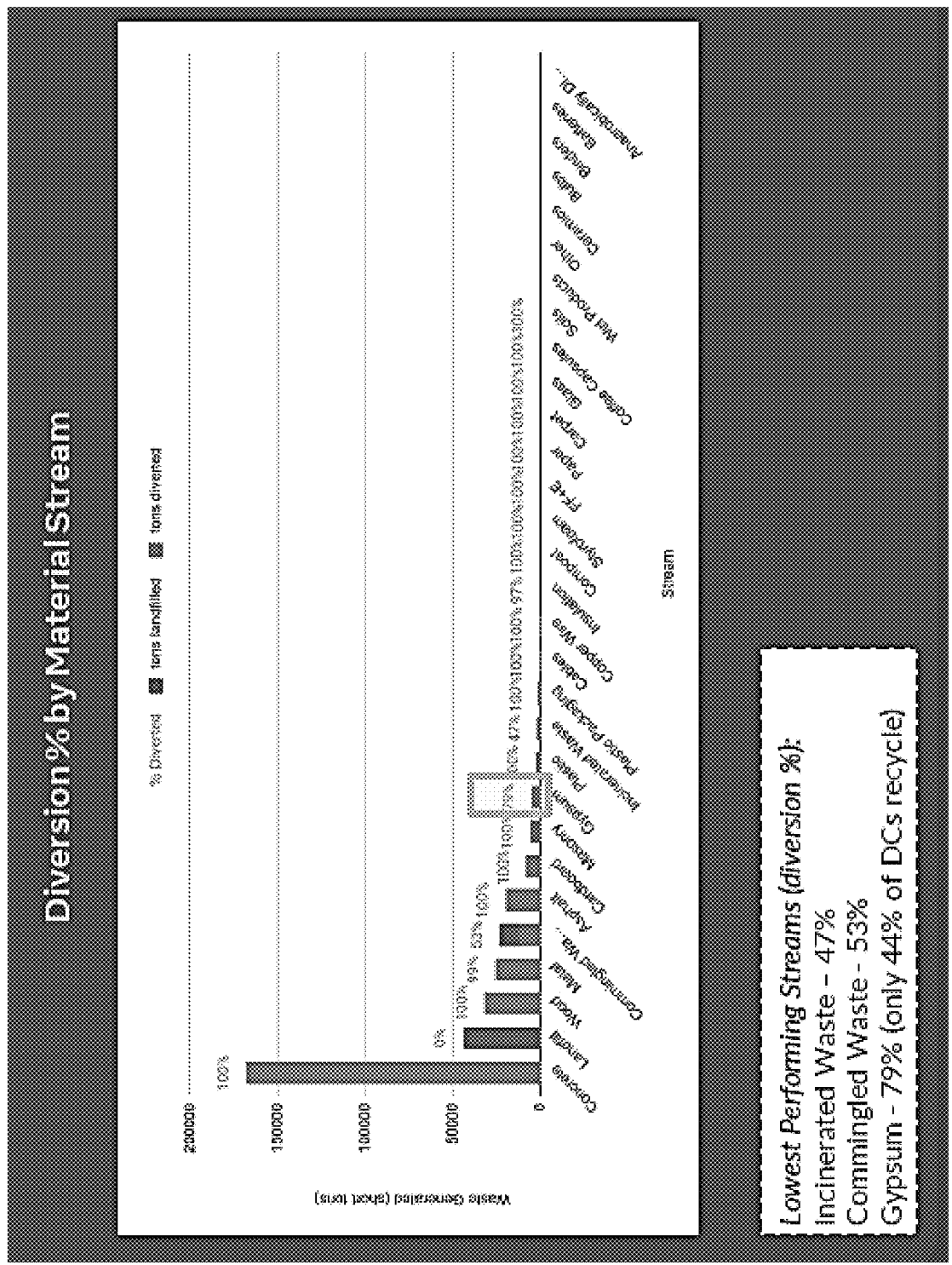
FIGS. 2A and 2B are graphs depicting the waste impact.
Figure 2B:
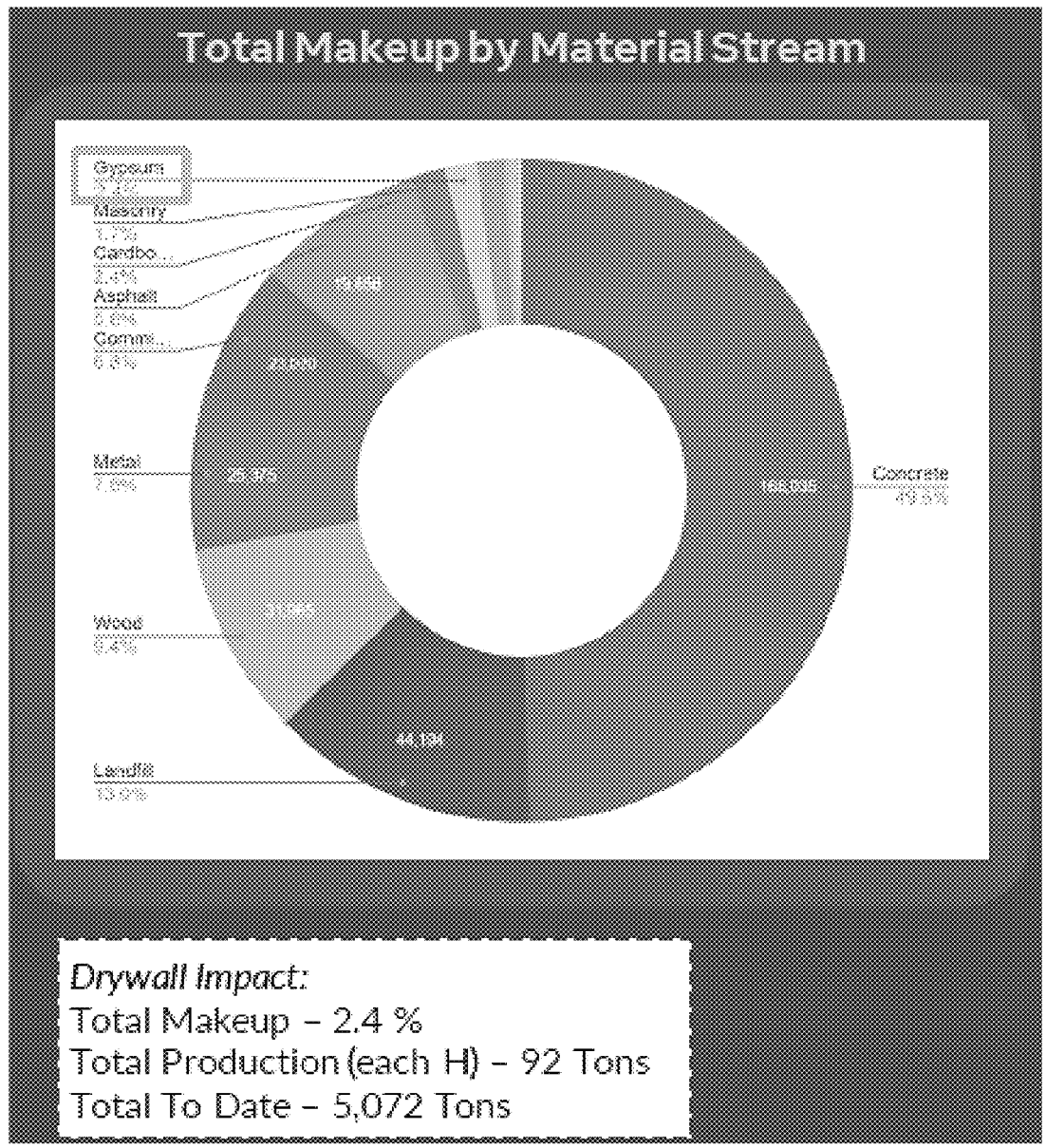

Gypsum disposal presents several challenges. Wet gypsum creates sulfate, which leaches into groundwater and produces a rotten egg smell. This affects local water supplies and introduces toxic emissions into local communities. Construction waste is also a significant issue. Gypsum is difficult to recycle, landfills are running out of room, and policies are starting to restrict construction materials. As shown in FIGS. 2A and 2B, gypsum is one of the lowest-performing streams in terms of diversion from landfills, even though it makes up a small portion of the materials stream.

Figure 3:
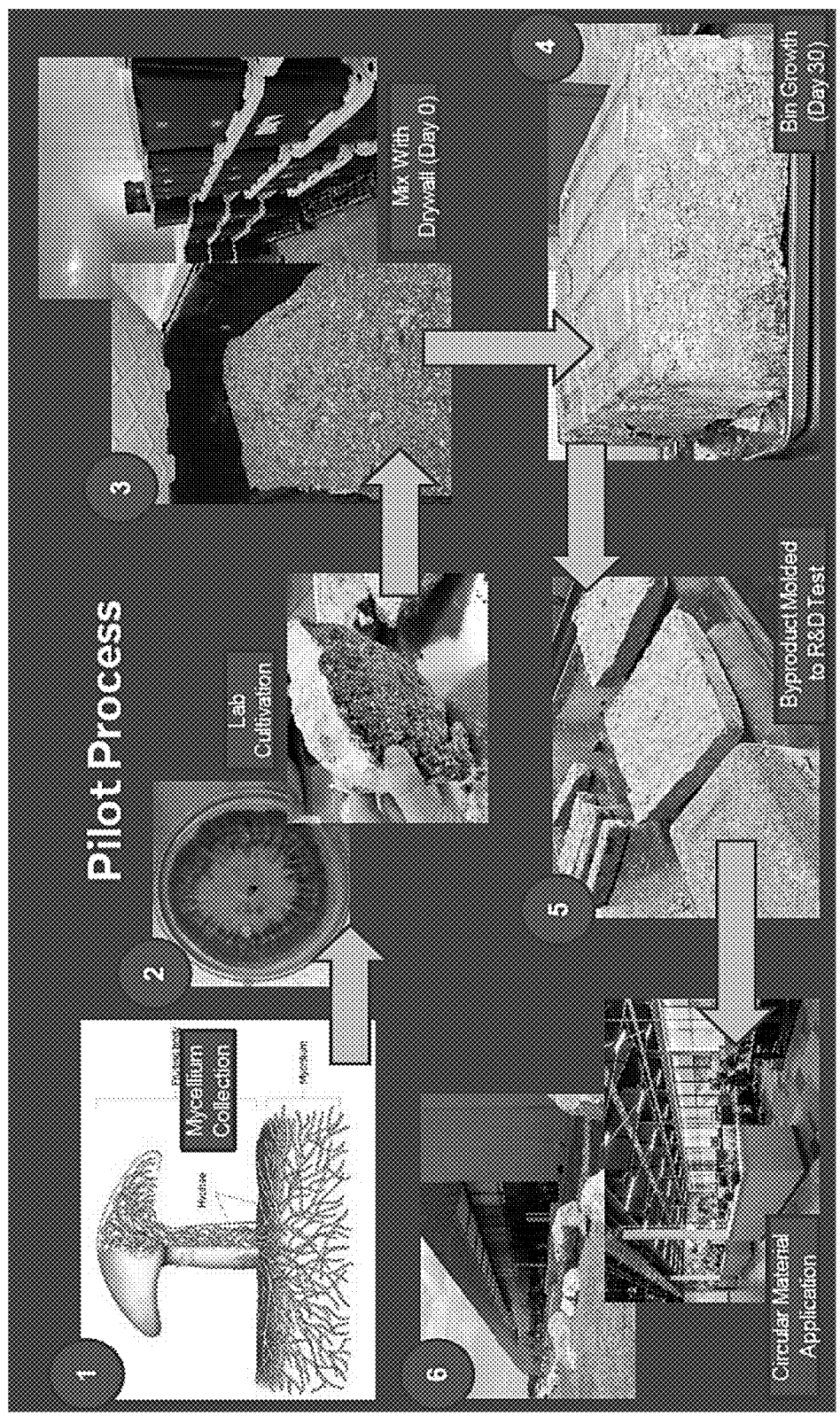
FIG. 3 is a method according to an aspect of the disclosure.

The disclosed novel methods and processes can eliminate the reliance on landfills by expanding the opportunities for gypsum diversion for those regions which cannot currently recycle this material and address future policy mandates that may restrict construction materials due to landfill space constraints. The disclosed novel methods and processes also encourage circularity by turning a once wasted building material back into a usable bio-material and reducing the water and environmental impacts resulting from landfilled materials. The disclosed methods also do not require the removal of the paper facer from the gypsum, which is required for all other known recycling applications. One aspect of the method is shown in FIG. 3.

Unless otherwise defined, all technical and scientific terms used herein have the same meaning as commonly understood by one of ordinary skill in the art to which the methods described herein belong. Any reference to standard methods (e.g., ASTM, TAPPI, AATCC, etc.) refers to the most recent available version of the method at the time of filing of this disclosure unless otherwise indicated.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The singular form "a", "an" and "the" include plural referents unless the context clearly dictates otherwise. These articles refer to one or to more than one (i.e., to at least one). As used herein, the term "or" is generally employed in its usual sense including "and/or" unless the content clearly dictates otherwise. The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

Where ranges are given, endpoints include all numbers subsumed within that range (e.g., 1 to 5 includes 1, 1.5, 2, 2.75, 3, 3.80, 4, 5, etc.). Furthermore, unless otherwise indicated or otherwise evident from the context and understanding of one of ordinary skill in the art, values that are expressed as ranges can assume any specific value or subrange within the stated ranges in different embodiments of the disclosure, to the tenth of the unit of the lower limit of the range, unless the context clearly dictates otherwise. Herein, "up to" a number (for example, up to 50) includes the number (for example, 50). The term "in the range" or "within a range" (and similar statements) includes the endpoints of the stated range.

Reference throughout this specification to "one aspect," "an aspect," "certain aspects," or "some aspects," etc., means that a particular feature, configuration, composition, or characteristic described in connection with the aspect is included in at least one aspect of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more aspects.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. The term "about" as used in connection with a numerical value throughout the specification and the claims denotes an interval of accuracy, familiar and acceptable to a person skilled in the art. In general, such interval of accuracy is +/−10%. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The term "exemplary" means serving as a non-limiting example, instance, or illustration. As utilized herein, the terms "e.g.," and "for example" set off lists of one or more non-limiting aspects, examples, instances, or illustrations.

As used herein, the term "substantially" refers to the qualitative condition of exhibiting total or near-total extent or degree of a characteristic or property of interest. Biological and chemical phenomena rarely, if ever, go to completion and/or proceed to completeness or achieve or avoid an absolute result. The term "substantially" is therefore used herein to capture the potential lack of completeness inherent in many biological and chemical phenomena. For example, "substantially" may refer to being within at least about 20%, alternatively at least about 10%, alternatively at least about 5% of a characteristic or property of interest.

The invention is defined in the claims. However, below is a non-exhaustive listing of non-limiting exemplary aspects. Any one or more of the features of these aspects may be combined with any one or more features of another example, embodiment, or aspect described herein.

One aspect of the disclosure is a method for producing a bio-based material. The method includes obtaining a waste material that includes gypsum. The waste material may further include calcium carbonate, magnesium hydroxide, paper, aluminum trihydrate, bulking agents, fillers, fibers and/or construction materials. In some non-limiting aspects, the waste material is gypsum, gypsum board, or gypsum drywall.

In an aspect, the method also includes preparing a growth medium. The growth medium is a support configured to support the growth of microorganisms, such as fungal cultures, mushroom spawns, and/or inoculums. The growth medium selected may depend on the microorganism being cultured. Gypsum is unique in that it generally includes materials, such as paper, which can be used as a growth medium. This reduces workflow times and process costs.

In an aspect, the method excludes soil from the growth medium and/or the waste material. Soil can contain unknown bioremediative components, which could lead to some unpredictability. Additionally, in a nonlimiting manner, the growth medium is not specifically designed for plant growth. However, this aspect is not to exclude the possibility of mixing the end product with soil to grow plants or alter landscape.

In an aspect, the growth medium is then incubated with at least one bioremediating composition to generate a molded growth material. Suitable bioremediating compositions and methods are disclosed in WO Publication 2020/055706, which is incorporated by reference into this disclosure. In an aspect of the method, the bioremediating composition includes at least one fungal culture. The bioremediating composition may also include a sterilizing agent and/or water.

The fungal culture may be any suitable fungal culture known in the art. In non-limiting examples, the fungal culture includes *Pleurotus ostreatus, Pleurotus pulmonarius, Ganoderma lucidum, Ganoderma tsugae, Ganoderma oregonense, Trametes versicolor, Pleurotus columbinus, Pleurotus eryngii, Agrocybe* spp., *Amanita* spp., *Armillaria* spp., *Auricularia* spp., *Cerrena* spp., *Coprinus* spp., *Cyathus* spp., *Daedalea* spp., *Daedaleopsis* spp., *Daldinia* spp., *Echinodontium* spp., *Exidia* spp., *Fistulina* spp., *Flammulina* spp., *Fames* spp., *Grifola* spp., *Hericium* spp., *Heterobasidion* spp., *Hypsizygus* spp., *Inonotus* spp., *Lenzites* spp., *Marasmius* spp., *Phanerochaete* spp., *Pisolithus* spp., *Sparassis* spp., *Strobilomyces* spp., *Xylaria* spp., *Pleurotus* spp., *Ganoderma* spp., *Trametes* spp. *Schizophyllum* spp., *Irpex* spp. and/or *Lentinula* spp.

In some aspects of the method, incubating includes monitoring the colonization of the fungal culture in the molded material. In some examples, the growth medium may be incubated with more than one bioremediating composition. For example, the growth medium is incubated with at least two bioremediating compositions, alternatively at least three bioremediating compositions, alternatively at least four bioremediating compositions, or alternatively at least five bioremediating compositions, wherein each bioremediating composition comprises a different fungal culture. If the growth medium is incubated with one or more bioremediating compositions, then one or more molded growth materials are generated. For example, if a growth medium is incubated with two bioremediating compositions, then a first molded growth material and a second molded growth material are generated. As such, in non-limiting examples, a growth material may be generated for each bioremediating composition used to incubate the growth medium.

The growth medium may be incubated with the bioremediating composition for at least about 3 days, alternatively at least about 5 days, alternatively at least about 1 week, alternatively at least about 2 weeks, alternatively at least about 3 weeks, alternatively at least about 4 weeks, or alternatively at least about 5 weeks.

In non-limiting examples, the method may further include hydrating the molded growth material; exposing the molded growth material to air; storing the molded growth material; drying the molded growth material; finishing the molded growth material to make a bio-based material; and/or collecting the bio-based material.

If the growth medium is incubated with more than one bioremediating composition, the method may further include selecting the molded material with the highest percentage of colonization. In this aspect, the growth medium(s) incubated with the one or more bioremediating compositions generates at least one primary molded growth material. The primary molded material may also undergo a secondary incubation. The resulting product is a secondary molded material. In this aspect, the method may further include hydrating the primary or secondary molded growth material; exposing the primary or secondary molded growth material to air; storing the primary or secondary molded growth material; drying the primary or secondary molded growth material; finishing the primary or secondary molded growth material to make a bio-based material; and/or collecting the bio-based material. These steps may be performed in any suitable order or certain steps may be omitted from the method.

In some aspects, the method includes:
a. obtaining a waste material, wherein a portion of the waste material is gypsum,
b. preparing a growth medium, wherein a portion of the growth medium is the waste material,
c. incubating the growth medium with at least one bioremediating composition to generate at least one primary molded growth material, wherein the at least one bioremediating composition includes at least one fungal culture,
d. monitoring the colonization in the primary molded growth material,
e. selecting the primary molded growth material with the highest percentage of colonization for a second incubation,
f. incubating the selected primary molded growth material to make a secondary molded growth material,
g. drying the secondary molded growth material,
h. finishing the secondary molded growth material to make a bio-based material; and,
i. collecting the bio-based material, wherein at least a portion of the bio-based material is a mycelium or a mycelium composite.

In some aspects, the method includes:
a. obtaining a waste material, wherein a portion of the waste material is gypsum,
b. preparing a growth medium, wherein a portion of the growth medium is the waste material,
c. incubating the growth medium with at least one bioremediating composition to generate at least one primary molded growth material, wherein the at least one bioremediating composition includes at least one fungal culture,
d. hydrating the primary molded growth material,
e. exposing the primary molded growth material air,
f. storing the primary molded growth material,
g. monitoring the colonization in the primary molded growth material,
h. selecting the primary molded growth material with the highest percentage of colonization for a second incubation,
i. incubating the selected primary molded growth material to make a secondary molded growth material,
j. hydrating the secondary molded growth material,
k. exposing the secondary molded growth material,
l. storing the secondary molded growth material,
m. drying the secondary molded growth material to make a bio-based material; and,
i. collecting the bio-based material, wherein at least a portion of the bio-based material is a mycelium or a mycelium composite.

In some aspects of the disclosure, the method produced a bio-based material with toxin levels lower than the levels of toxins in the waste material. Non-limiting examples of toxins include antimony, arsenic, beryllium, cadmium, chromium, copper, lead, mercury, nickel, selenium, silver, thallium, zine, acetone, and combinations thereof.

In some aspects, the resulting bio-based material may also have similar characteristics to low density or foamed materials.

In some aspects, the bio-based material, or a portion thereof, may include mycelium, mycelium spawn, or a mycelium composite. The bio-based material may also include gypsum. In a non-limiting example, the bio-based material includes gypsum drywall and mycelium spawn. In this example, the gypsum drywall may be a mix of several components, including gypsum and cellulose (which may include glass, oxide, and 2-Pyridinethiol, 1-oxide, sodium salt).

One aspect of the disclosure includes a method of reducing and/or preventing greenhouse gas emissions through on-site remediation. In conventional methods, materials, such as building materials, that can't be reused on-site are transported to a landfill or recycling facility. These materials can also contain contaminants and the disposal process may be challenging. According to the US Environmental Protection Agency, transportation generates the largest share of greenhouse gas emissions of 2021 (28% greenhouse gas emissions) https://www.epa.gov/ghgemissions/sources-greenhouse-gas-emissions. By allowing for on-site remediation, for example using a mobile, isolated, contained environment, the inventors have unexpectedly discovered a method for reducing greenhouse gas emissions while also reducing contaminants. In addition, reuse of the building materials saves the carbon costs of manufacturing.

EXAMPLES

Example 1—Pilot Study

To investigate inoculation ratio is more capable of reducing toxicity and to what extent inoculum chemically and biologically alters the waste material such that it allows for reuse in a very base form of clean fill, drainage materials, or other soil amendment, a pilot method was developed.

Table 1 indicates the percentage of total bins under each qualitative category of mycelium growth.

TABLE 1

| Growth | GD30 (n = 20) | GD50 (n = 30) |
|---|---|---|
| Best | 15% | 40% |
| Good | 85% | 33% |
| Okay | — | 27% |

Environmental Quality Testing

The base and collected samples were analyzed for various environmental factors, as shown in Table 2 (in W=weeks).

TABLE 2

| Analyte | Base 1 (n = 1) | GD30-W1 (n = 1) | GD30-W3 (avg. n = 3) | GD30-W4 (avg. n = 3) | GD30-W1 (n = 1) | GD50-W3 (avg. n = 3) | GD50-W4 (avg. n = 3) |
|---|---|---|---|---|---|---|---|
| Humidity by ASTM D2974 (%) | | | | | | | |
| Percent Moisture | 13.20 | 30.80 | 19.97 | 21.47 | 30.80 | 26.90 | 29.43 |
| Mercury by Method 7471B mg/kg dry | | | | | | | |
| Mercury | 0.106 | 0.087 | 0.083 | 0.071 | 0.060 | 0.109 | 0.076 |
| Metals by Method 3050B (mg/kg dry) | | | | | | | |
| Antimony | ND | ND | ND | ND | ND | ND | ND |
| Arsenic | ND | ND | ND | ND | ND | ND | ND |
| Beryllium | ND | ND | ND | ND | ND | ND | ND |
| Cadmium | ND | ND | ND | ND | ND | ND | ND |
| Chromium | 2.94 | 2.26 | 2.43 | 2.12 | 1.93 | 1.85 | 2.10 |
| Copper | 0.50 | 1.53 | 1.53 | 1.19 | 1.75 | 1.87 | 1.88 |
| Lead | 1.36 | ND | ND | 1.42 | ND | ND | ND |
| Nickel | 0.55 | 1.07 | 0.96 | 0.67 | 1.17 | 1.05 | 1.02 |
| Selenium | 4.77 | 1\1D | 2.80 | 3.77 | ND | 1.39 | ND |
| Silver | ND | ND | ND | 0.47 | ND | ND | ND |
| Thallium | ND | ND | ND | 4.72 | ND | ND | ND |
| Zinc | 5.60 | 14.90 | 12.17 | 13.63 | 16.70 | 17.27 | 16.87 |
| VOC by Method 8260B (mg/kg dry) | | | | | | | |
| Acetone | ND | 13.20 | ND | 2.79 | 31.30 | ND | 1.81 |

The pilot project was designed as a controlled, full, multi-factorial mesocosm experiment at the field scale with the following three factors. Mushroom Spawn in the form of mycelium; New/discarded material (gypsum drywall); and Inoculation ratios (% of spawn per material total, GD30 and GD50). In this example, GD30 and GD50 are *Ganoderma lucidum* at an inoculation ratio of 30% and *Ganoderma lucidum* at an inoculation ratio of 50%, respectively. *Ganoderma lucidum*, is a red-colored species of *Ganoderma* with a limited distribution in Europe and parts of China, where it grows on decaying hardwood trees. Wild populations have been found in the United States in California and Utah but were likely introduced by people. It has fruiting body almost always has a stipe present, which is tawny to russet colored, a context tissue that is pinkish to cinnamon colored with concentric growth zones.

Methods

Figure 4:
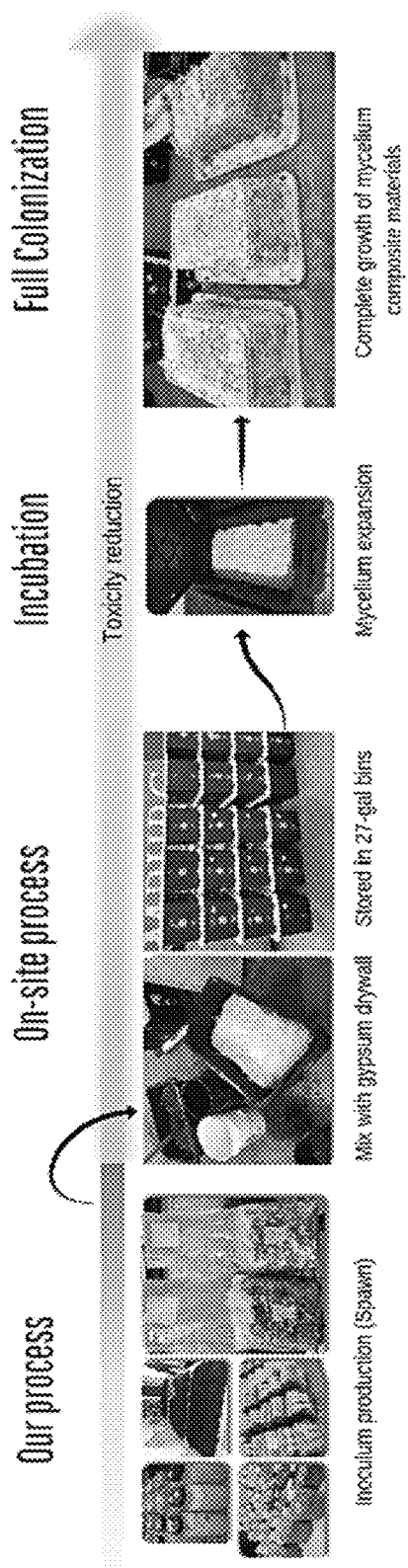
FIG. 4 is a method according to an aspect of the disclosure.

Recovered gypsum drywall waste was supplied and processed on-site over the course of four weeks. The recovered gypsum was treated with a mushroom spawn (inoculum). The treated material was placed in 27-gal containers (50×) and supersacks (4×). A total of 3,250 lbs. of treated material was placed in incubation conditions for monitoring (FIG. 4)

Mycelium Growth

Figure 5:
FIG. 5 shows a qualitative determination of mycelium growth based on mycelium growth.

As shown in FIG. 5, the treatment and environmental conditions were adequate enough to have healthy growth and, therefore, mycological conversion of the waste material into new mycelium-based composites.

Humidity increased with the addition of the mushroom spawn and decreased over time. Mercury was present in the Baseline sample composed of 100% Gypsum Drywall. Of the 12 metals tested: antimony, arsenic, beryllium, and cadmium were Non-Detects (value below detectable limit) for all samples. Silver and thallium were Non-detects for all samples except GD30-W4. Chromium concentrations of GD30 and GD50 samples were lower than the base. Copper, nickel, and zinc concentrations of GD30 and GD50 samples were higher than the base. Of the 161 VOC tested: Only acetone registered values higher than the base but decreased over time.

Results

Humidity (as Moisture Percentages) by ASTM D2974

The increase of humidity at W1, W2, and W3 compared to the baseline, which is 100% waste material, is to be expected as the fungal inoculum is produced with adequate moisture for the fungi to live on. However, a steady decrease over time implies that the mycelium consumed the moisture available in the substrate blends reflective of healthy growth throughout the duration of the pilot project.

Figure 6:
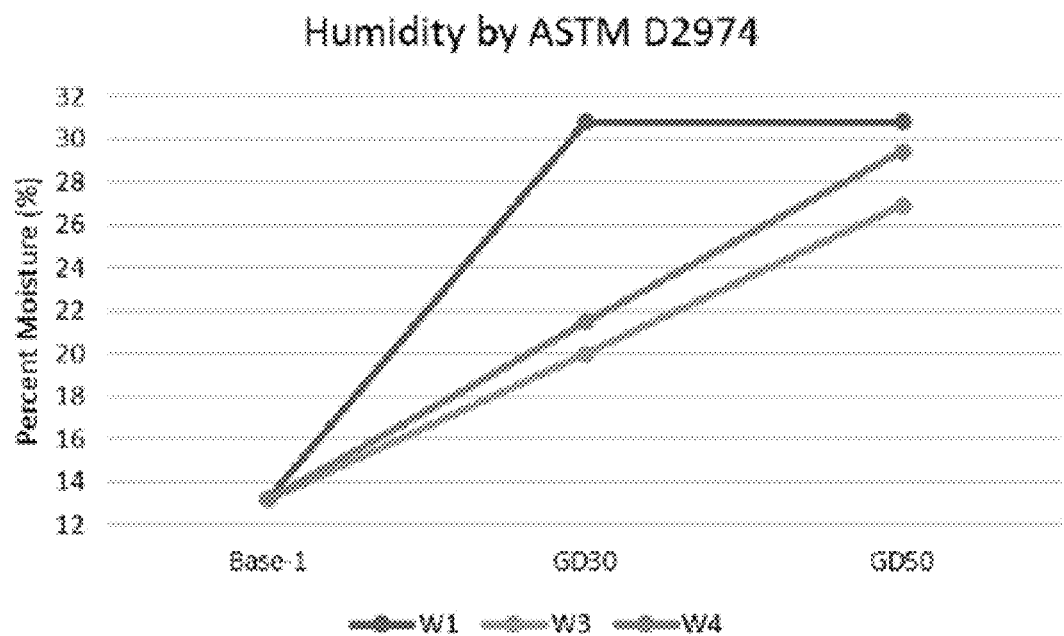
FIG. 6 is a graph comparing the moisture percentages of the base and inoculated samples.

FIG. 6 is a graph comparing the moisture percentages of the base and inoculated samples.

Mercury by Method 7471B

Mercury concentrations were highest in the baseline sample and decreased steadily over time in the GD30 samples. GD50 samples did show a decrease over time, but there was an unexpected spike in the W3 samples. Even though mercury has a high degree of toxicity, all the values presented in this study were below Human Health Screening Levels as presented by the California Office of Environmental Health Hazard Assessment with a value of 18 mg/kg (ppm). The levels of mercury and other metals were below the level of concern for human health.

Figure 7:
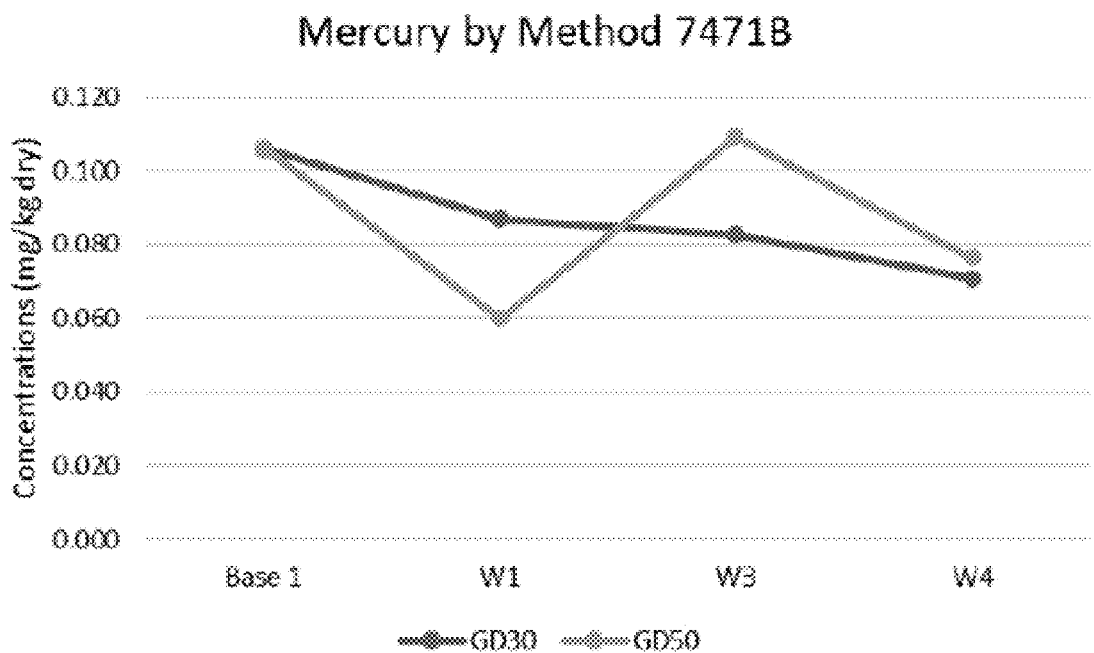
FIG. 7 is a graph showing mercury concentrations presented by both inoculum ratios (GD30 and GD50) over the duration of the pilot.

FIG. 7 is a graph showing mercury concentrations presented by both inoculum ratios (GD30 and GD50) over the duration of the pilot.

Priority Pollutant Metals by Method 3050B

From the 12 metals that were tested, only four registered values over time. It was observed that the metal with the highest presence in the samples analyzed was zinc, a common metal found not only in gypsum drywall but also in conventional mushroom cultivation substrates such as hardwood sawdust. It is not uncommon to observe an increase in the uptake of these metals as the mycelium continues to degrade its substrate via enzymatic/oxidative mechanisms to obtain its nutrition.

Figure 8A:
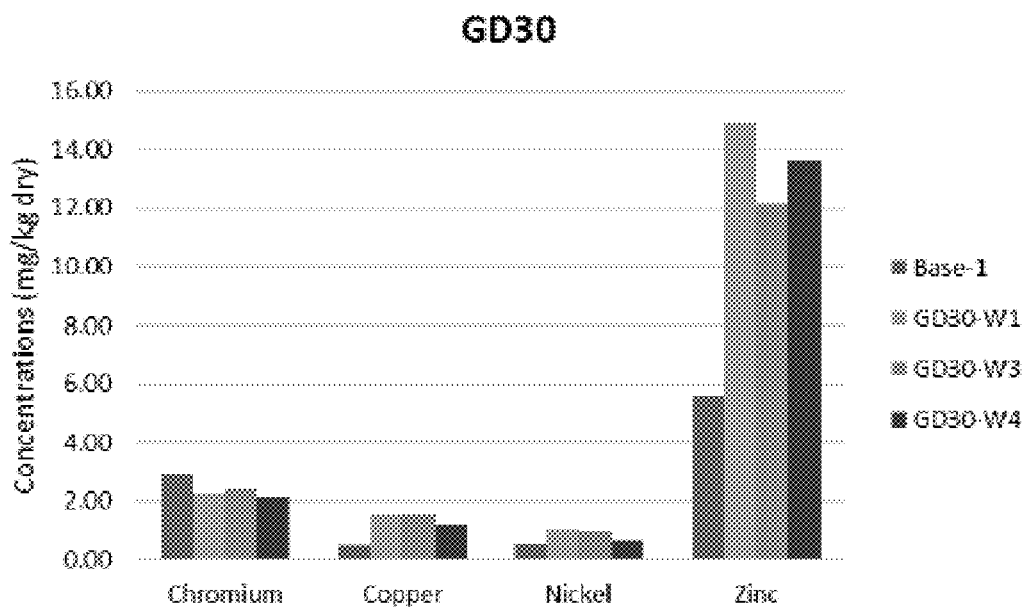
FIGS. 8A and 8B are graphs showing metal concentrations that registered values over time for baseline, GD30, and GD50 samples.
Figure 8B:
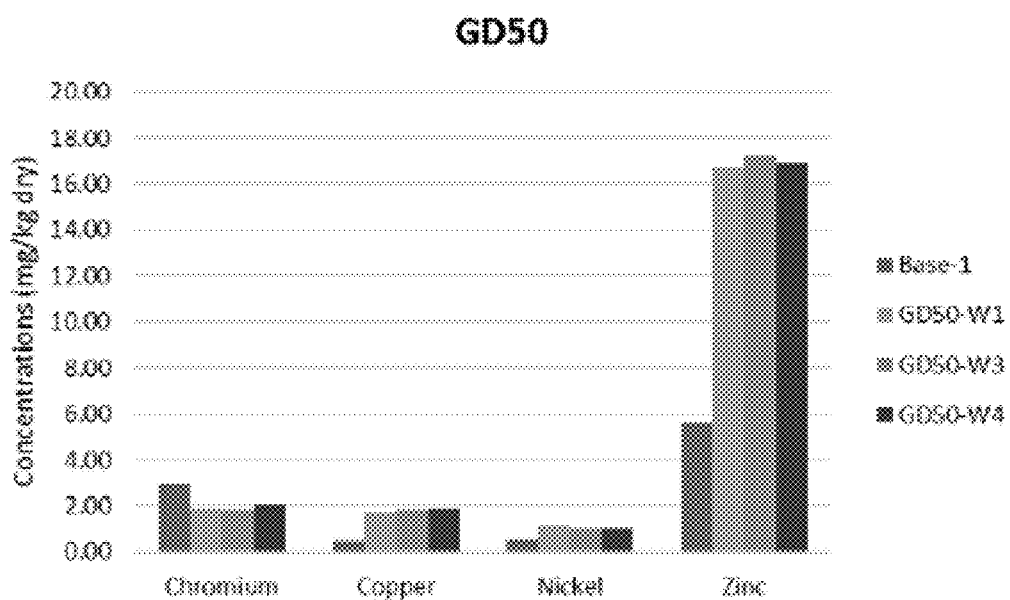

FIGS. 8A and 8B are graphs showing metal concentrations that registered values over time for baseline, GD30, and GD50 samples.

Volatile Organic Compounds by Method 8260B

Acetone was the only VOC that registered values over the duration of the pilot. It is a very common organic solvent with a rapid evaporation rate and is an excellent degreaser and cleaner for all common metals, glass, porcelain, many plastics, and synthetic fibers. Although concentrations were higher in W1 than the base, the fungi were able to degrade over time.

Figure 9:
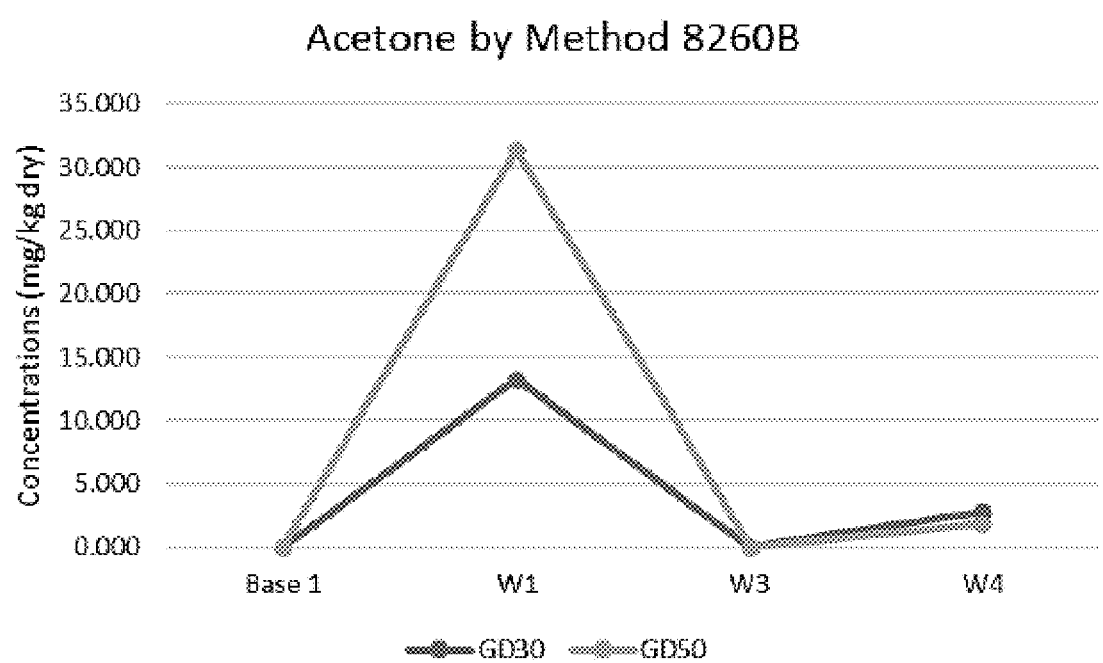
FIG. 9 is a graph showing acetone presented by both inoculum ratios (GD30 and GD50) over the duration of the pilot.

FIG. 9 is a graph showing acetone presented by both inoculum ratios (GD30 and GD50) over the duration of the pilot.

Mechanical Testing

Figure 10A:
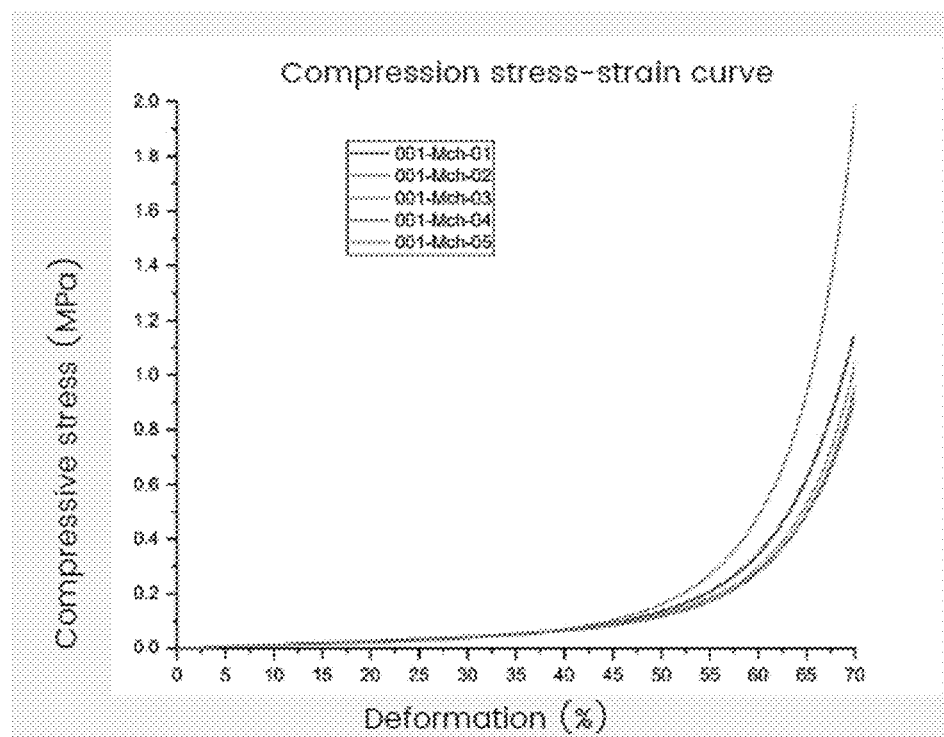
FIGS. 10A and 10B are graphs showing the results of mechanical testing: compressive strength (FIG. 10A) and flexural strength (FIG. 10B).
Figure 10B:
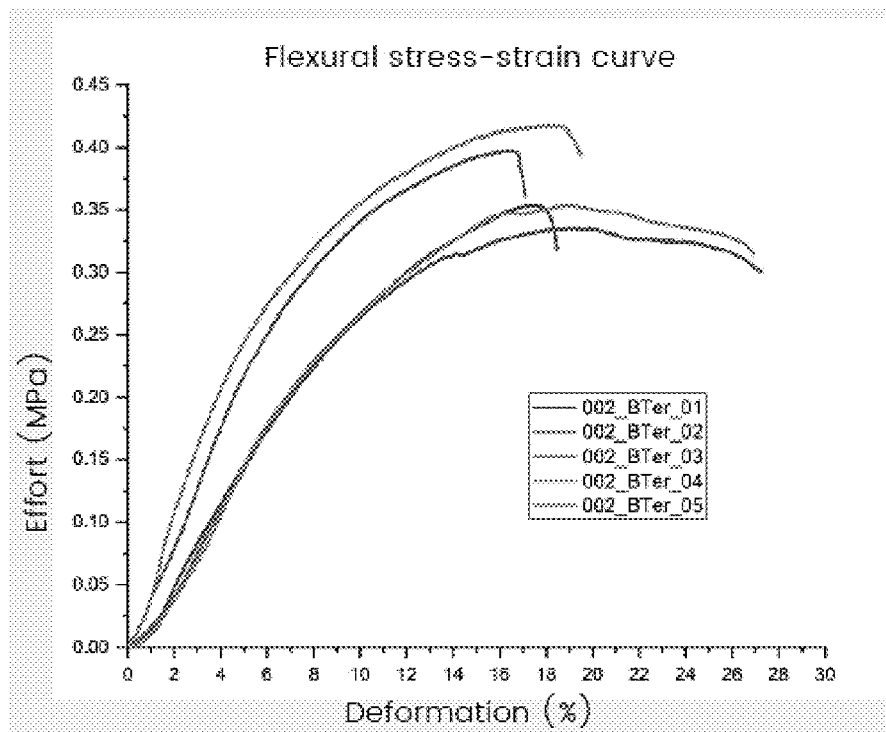

Mechanical testing was also done to determine the compressive strength (FIG. 10A) and flexural strength (FIG. 10B).

The tests performed show similar characteristics to low density or foamed materials such as EPS or expanded polystyrene (unicell). There is little information, and so far, there are no standards or norms applicable to the subject of mycelium composites. This opens the door to experimenting with different production processes, such as cold or hot pressing, to increase these composites' density and mechanical properties. It is also important to perform other types of destructive and non-destructive tests to determine the physical properties of mycelium composites, such as acoustic tests, fire resistance tests, permeability, and weathering, among others.

Conclusions

Given their metabolic and physiological characteristics, fungi have a large biotechnological potential, and when growing mycelium on solid organic substrates, a lightweight composite material is obtained consisting of a three-dimensional interwoven network of filamentous mycelial cells. Minimal differences in growth existed between the two inoculation ratios, although GD50 samples were able to accumulate higher concentrations of the heavy metals. The reduction of mercury and chromium reflects the extent of degradation. It is established that fungi can remove metals through extracellular adsorption and intracellular accumulation as they reach full colonization of their substrate, which was obtained in both inoculum ratios in this present study.

This study successfully demonstrates the disclosed process's capacity to improve the composition of waste materials and create reuse pathways within a low-carbon circular economy model.

Example 2—Field-Based Remediation

The method disclosed in Example 1 was used to scale on 2-tons of gypsum drywall waste. However, the variables were limited to 1-species and 2-species blends. The gypsum materials were mixed with the inoculum and incubated for 2-4 weeks. Quantitative measurements were taken on the initial sample set up, batch test, and post-treatment materials (Day 1, Day 14, and Day 28) and the results were analyzed.

After the first 30 days in primary incubation, the molded materials with the highest percentage of colonization by the fungus was selected. These samples were then placed in a box for transport to enter post-production process. The secondary incubation process takes place wherein the weight and dimensions of each material were measured and labeled with keys for its identification. It is was then placed in a larger container for a secondary incubation period of 5-7 days.

Figure 11:
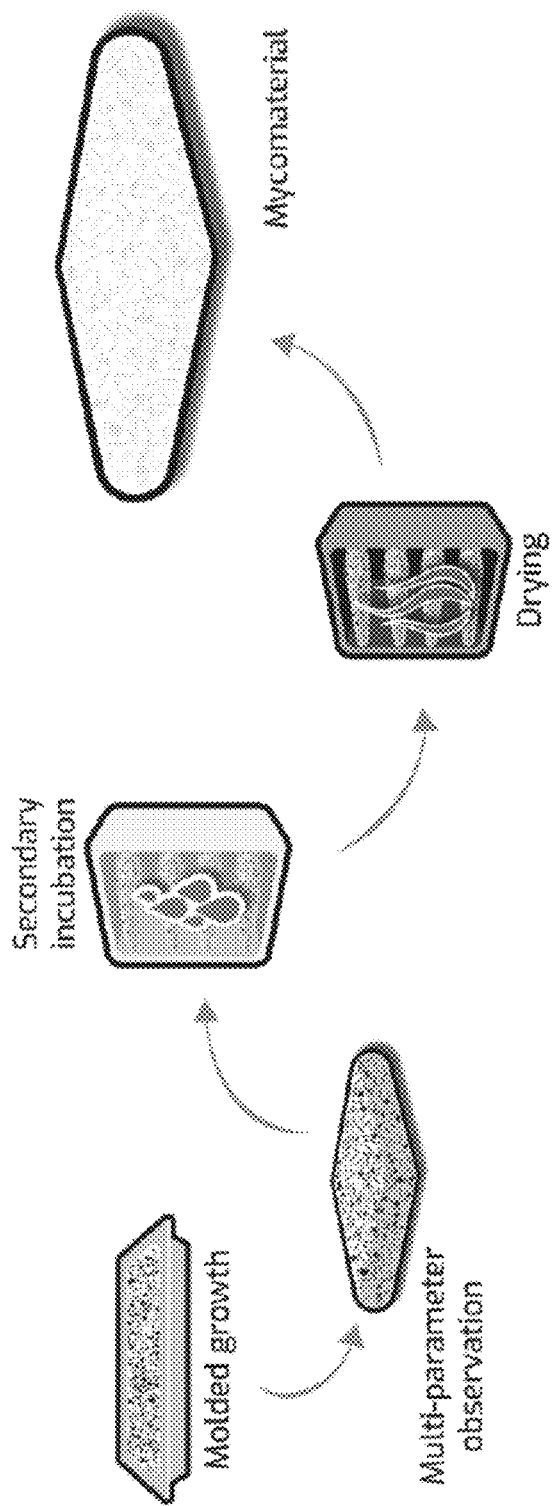
FIG. 11 illustrates a method according to an aspect of the disclosure.
Figure 12A:
FIGS. 12A, 12B, and 12C are photographs of steps of a method according to an aspect of this disclosure.
Figure 12B:
Figure 12C:

Drying and finishing: The materials were removed from secondary incubation and exposed to a drying process until approximately 30% of its initial weight was lost. Molds (forms) were used to prepare the mycelium composites at the time of inoculation. The samples were in primary incubation (treatment) for the 30 days that the method was running, plus five days in secondary incubation before drying off for two days. FIG. 11 is an illustration of the method. Various steps of the method are also in FIGS. 12A, 12B, and 12C.

A total of 3 replicates of each treatment for a total of 12 samples were then sent to the lab for mechanical testing.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

The complete disclosure of all patents, patent applications, publications, and electronically available material cited herein are incorporated by reference. In the event that any inconsistency exists between the disclosure of the present application and the disclosure(s) of any document incorporated herein by reference, the disclosure of the present application shall govern.

It will be understood that while the invention has been described in conjunction with the detailed description thereof, the foregoing description is intended to illustrate and not limit the scope of the invention, which is defined by the scope of the appended claims. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. Other aspects, advantages, and modifications are within the scope of the following claims.

What is claimed is:

1. A method for producing a bio-based material, the method comprising:
   obtaining a waste material, wherein at least a portion of the waste material comprises gypsum;
   preparing a growth medium, wherein at least a portion of the growth medium comprises the waste material;
   incubating the growth medium with at least one bioremediating composition to generate a molded growth material, wherein the at least one bioremediating composition comprises at least one fungal culture, wherein the incubation results in a reduction of toxins and/or volatile organic compounds (VOCs) in the molded growth material as compared to the level of toxins and/or volatile organic compounds (VOCs) in the growth medium prior to incubation;
   and producing a bio-based material from the molded growth material.

2. The method of claim 1, wherein the gypsum is selected from the group consisting of crude gypsum, raw gypsum, gypsum board, gypsum drywall, gypsum building material, a board with a gypsum core and a paper facing, sheet products consisting essentially of gypsum, gypsum panels, gypsum plaster, gypsum ceiling tiles, gypsum partitions, gypsum sheathing, and combinations thereof.

3. The method of claim 2, wherein the growth medium and/or the waste material does not comprise soil.

4. The method of claim 1, wherein the growth medium is incubated with at least two bioremediating compositions wherein each bioremediating composition comprises a different fungal culture.

5. The method of claim 1, wherein the growth medium is incubated with the bioremediating composition for at least about 3 days.

6. The method of claim 1, wherein incubating comprises monitoring colonization of the fungal culture in a molded material.

7. The method of claim 6, wherein the method further comprises selecting the molded material with the highest percentage of colonization.

8. The method of claim 7, wherein the selected molded material undergoes a secondary incubation.

9. The method of claim 6, wherein the method further comprises hydrating the molded growth material; exposing the molded growth material to air; storing the molded growth material; drying the molded growth material; finishing the molded growth material to make a bio-based material; and/or collecting the bio-based material.

10. The method of claim 1, wherein the fungal culture comprises *Pleurotus ostreatus, Pleurotus pulmonarius, Ganoderma lucidum, Ganoderma tsugae, Ganoderma oregonense, Trametes versicolor, Pleurotus columbinus, Pleurotus eryngii, Agrocybe* spp., *Amanita* spp., *Armillaria* spp., *Auricularia* spp., *Cerrena* spp., *Coprinus* spp., *Cyathus* spp., *Daedalea* spp., *Daedaleopsis* spp., *Daldinia* spp., *Echinodontium* spp., *Exidia* spp., *Fistulina* spp., *Flammulina* spp., *Fames* spp., *Grifola* spp., *Hericium* spp., *Heterobasidion* spp., *Hypsizygus* spp., *Inonotus* spp., *Lenzites* spp., *Marasmius* spp., *Phanerochaete* spp., *Pisolithus* spp., *Sparassis* spp., *Strobilomyces* spp., *Xylaria* spp., *Pleurotus* spp., *Ganoderma* spp., *Trametes* spp. *Schizophyllum* spp., *Irpex* spp. and/or *Lentinula* spp.

11. The method of claim 1, wherein the waste material further comprises cellulose, glass, oxides, chemicals, calcium carbonate, magnesium hydroxide, paper, aluminum trihydrate, bulking agents, fillers, fibers and/or material present in construction materials.

12. The method of claim 1, wherein the toxins are selected from the group consisting of antimony, arsenic, beryllium, cadmium, chromium, copper, lead, mercury, nickel, selenium, silver, thallium, zine, acetone, and combinations thereof.

13. The method of claim 1, wherein levels of VOCs in the molded growth material are at least about 50% lower than the levels of VOCs in the growth medium prior to incubation.

14. The method of claim 1, wherein the bio-based material has similar characteristics to low density or foamed materials.

15. The method of claim 1, wherein the bio-based material comprises mycelium, mycelium spawn, or a mycelium composite.

16. The method of claim 15, wherein the bio-based material further comprises gypsum.

17. The method of claim 16, wherein the gypsum is gypsum drywall.

18. A bio-based material produced by the method of claim 1, comprising gypsum drywall and mycelium spawn.

19. The method of claim 1, wherein the method is performed in a mobile, isolated, contained environment thereby reducing and/or preventing greenhouse gas emissions.

20. The method of claim 1, wherein the bioremediating composition is present in an amount of at least about 30% (w/w) of the growth medium.

21. The method of claim 1, wherein the molded growth material is incubated for at least three weeks.

22. A method for producing a bio-based material, the method comprising:
   obtaining a waste material, wherein a portion of the waste material is gypsum;
   preparing a growth medium, wherein a portion of the growth medium comprises the waste material;
   incubating the growth medium with at least one bioremediating composition to generate at least one primary molded growth material, wherein the at least one bioremediating composition includes at least one fungal culture;
   monitoring the colonization in the primary molded growth material;
   selecting the primary molded growth material with the highest percentage of colonization for a second incubation;
   incubating the selected primary molded growth material to make a secondary molded growth material;
   drying the secondary molded growth material;
   finishing the secondary molded growth material to make a bio-based material;
   and collecting the bio-based material, wherein at least a portion of the bio-based material comprises a mycelium or a mycelium composite.

23. The method of claim 22, wherein the first and/or second incubation results in a reduction of toxins and/or volatile organic compounds (VOCs) in the molded growth material as compared to the level of toxins and/or volatile organic compounds (VOCs) in the growth medium prior to incubation.

* * * * *